J. H. PHIPPS.
NUT LOCK.
APPLICATION FILED MAY 29, 1913.
1,082,211.  Patented Dec. 23, 1913.
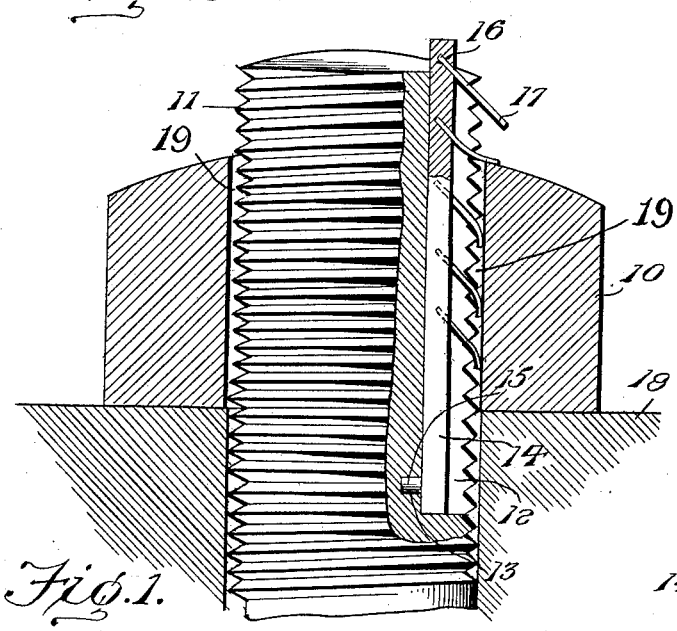
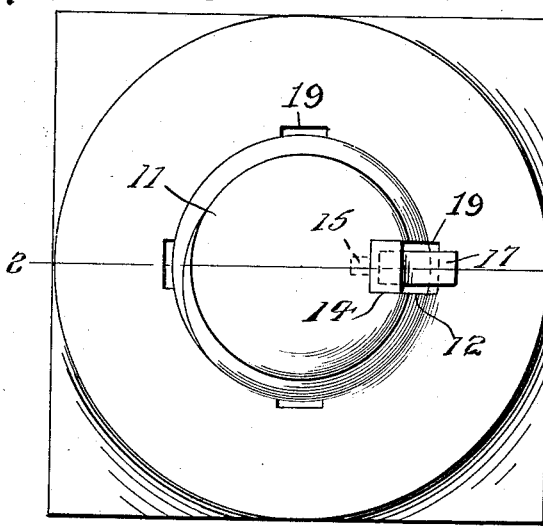
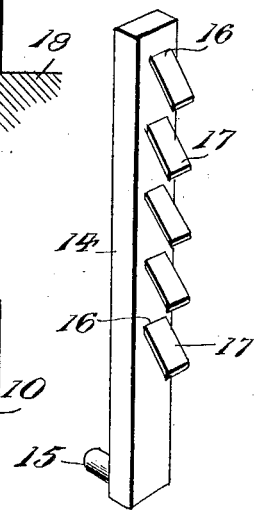
Inventor
J. H. Phipps.

UNITED STATES PATENT OFFICE.

JOHN H. PHIPPS, OF WICKLIFFE, KENTUCKY, ASSIGNOR OF ONE-HALF TO JOHN A. HINES, OF WICKLIFFE, KENTUCKY.

NUT-LOCK.

1,082,211.　　　　　Specification of Letters Patent.　　Patented Dec. 23, 1913.

Application filed May 29, 1913. Serial No. 770,709.

*To all whom it may concern:*

Be it known that I, JOHN H. PHIPPS, citizen of the United States, residing at Wickliffe, in the county of Ballard and State of Kentucky, have invented certain new and useful Improvements in Nut-Locks, of which the following is a specification.

This invention relates to improvements in nut locks for preventing the retrograde movement of nuts upon bolts, and has for one of its objects to simplify and improve the construction and increase the efficiency and utility of devices of this character.

Another object of the invention is to provide a simply constructed device which may be readily repaired in event of the breakage of the attachment, and without discarding the remaining portions of the device.

With these and other objects in view the invention consists in certain novel features of construction as hereinafter shown and described and then specifically pointed out in the claims, and in the drawings illustrative of the preferred embodiment of the invention, Figure 1 is a plan view of a conventional nut and bolt with the improvement applied. Fig. 2 is a section on the line 2—2 of Fig. 1. Fig. 3 is a detached perspective view of the locking member.

Corresponding and like parts are referred to in the following description and indicated in all the views of the drawings by the same reference characters.

The nut is represented conventionally at 10 and the bolt at 11. The bolt is formed with a longitudinal channel or groove at 12 transversely of its threads, and with a socket 13 in the bottom of the channel, this being the only change required in the bolt. The nut 10 is provided with one or more recesses or channels 19 transversely of its threads, this being the only change in the nut.

Engaging in the channel 12 is a bar 14 which completely fills the inner portion of the channel but is of less thickness than the depth of the channel so that the outer face of the bar comes below the inner portions of the threads of the bolt, thus leaving a space between the outer face of the bar 14 and the threads as represented in Fig. 2. The bar 14 is provided with a pin 15 which engages in the socket 13 of the bolt, and thus holds the bar from longitudinal movement in the channel. The bar 14 is provided with a plurality of oblique sockets 16 to receive obliquely disposed resilient pawls 17. Any required number of the sockets and pawls may be employed, but for the purpose of illustration five of the pawls are shown, but it will be obvious that a greater or lesser number may be used as required. The pawls project normally beyond the outer face of the bolt as shown by the upper pawls in Fig. 2.

With a device thus constructed when the nut is to be applied it is turned home against the structure through which the bolt passes, and represented conventionally at 18, and adjusted until the channel 12 of the bolt is opposite one of the channels 19 of the nut. The bar 14 is then inserted in the channel 12 and the registering channel 19 and the pawls 17 bent downwardly one at a time as the bar is inserted until the stop pin 15 enters the cavity 13, when the pawl 17 which is nearest the upper face of the nut will extend over the same as represented in Fig. 2 and thus effectually lock the bar from displacement and likewise effectually prevent retrograde movement of the nut.

By providing a plurality of the pawls spaced at relatively short distances apart, and by providing a plurality of the channels or recesses 19, the nut may be held at any required point corresponding to the thickness of the body 18.

The improved device is simple in construction, can be inexpensively manufactured and applied to bolts of various sizes and to nuts of various shapes.

Having thus described the invention, what is claimed as new is:

1. In a nut lock, a bolt having a longitudinal channel in its threaded portion, a bar engaging in said channel and having a plurality of sockets spaced apart, a resilient pawl engaging in each of said sockets and extending beyond the threads of said bolt, and means for holding said bar in said channel.

2. In a nut lock, a bolt having a longitudinal channel, a nut having an inwardly opening channel, a bar engaging the channel of said bolt, a plurality of resilient pawls carried by said bar and spaced apart, said pawls extending normally beyond the outer face of said bolt and engaging respectively in the channel of said nut and over the outer face of the nut, and means for holding said bar in said channel.

In testimony whereof I affix my signature in presence of two witnesses.

JOHN H. PHIPPS. [L. S.]

Witnesses:
 JOHN HENDERSON,
 HERB. H. STOVALL.

Copies of this patent may be obtained for five cents each, by addressing the "Commissioner of Patents, Washington, D. C."